(12) United States Patent
Olver

(10) Patent No.: US 11,111,856 B2
(45) Date of Patent: Sep. 7, 2021

(54) TURBOFAN ENGINE AND CORE LINK THEREFORE

(71) Applicant: PRATT & WHITNEY CANADA CORP., Longueuil (CA)

(72) Inventor: Bryan William Olver, Collingwood (CA)

(73) Assignee: PRATT & WHITNEY CANADA CORP, Longueuil (CA)

( * ) Notice: Subject to any disclaimer, the term of this patent is extended or adjusted under 35 U.S.C. 154(b) by 162 days.

(21) Appl. No.: 16/291,719

(22) Filed: Mar. 4, 2019

(65) Prior Publication Data

US 2020/0284198 A1 Sep. 10, 2020

(51) Int. Cl.
| | |
|---|---|
| *F02C 7/12* | (2006.01) |
| *F01D 25/28* | (2006.01) |
| *F01D 25/12* | (2006.01) |
| *F02K 3/06* | (2006.01) |
| *F01D 25/02* | (2006.01) |
| *B64D 33/00* | (2006.01) |
| *B64D 15/02* | (2006.01) |

(52) U.S. Cl.
CPC ............... *F02C 7/12* (2013.01); *B64D 15/02* (2013.01); *B64D 33/00* (2013.01); *F01D 25/02* (2013.01); *F01D 25/12* (2013.01); *F01D 25/28* (2013.01); *F02K 3/06* (2013.01); *F05D 2260/213* (2013.01); *F05D 2260/30* (2013.01); *F05D 2300/224* (2013.01)

(58) Field of Classification Search
CPC .... F02C 7/14; F02C 7/12; F02C 7/141; F02C 7/143; F02C 7/16; F02C 7/18; F02C 7/047; F02C 7/20; F02C 6/08; F01D 25/28; F01D 25/12; F01D 25/02; F01D 9/065; F01D 25/243; F01D 5/187; F01D 5/188; F01D 17/105; F01D 25/10; F05D 2260/20; F05D 2260/213; B64D 15/02; B64D 15/04; B64D 29/06; B64D 2033/0233

See application file for complete search history.

(56) References Cited

U.S. PATENT DOCUMENTS

| | | | |
|---|---|---|---|
| 5,729,969 A | * | 3/1998 | Porte .................... F02C 6/08 60/226.1 |
| 6,035,627 A | | 3/2000 | Liu |
| 9,068,476 B2 | | 6/2015 | Caulfeild et al. |

(Continued)

OTHER PUBLICATIONS

MIT, Lecture, 2006, section 18.5, Thermodynamics and Propulsion (Year: 2006).*

*Primary Examiner* — Steven M Sutherland
*Assistant Examiner* — Rodolphe Andre Chabreyrie
(74) *Attorney, Agent, or Firm* — Norton Rose Fulbright Canada LLP

(57) ABSTRACT

The turbofan engine can have a core engine, a bypass duct surrounding the core engine, an annular bypass flow path between the bypass duct and the core engine, and a plurality of core links extending across the bypass path and supporting the core engine relative to the bypass duct, and a fluid passage having a heat exchange portion in a given one of the core links, the heat exchange portion being configured for heat exchange with the bypass flow path, an inlet leading into the given core link and to the heat exchange portion, and an outlet extending from the heat exchange portion and out of the given core link.

14 Claims, 4 Drawing Sheets

(56) References Cited

U.S. PATENT DOCUMENTS

| | | | |
|---|---|---|---|
| 2006/0042223 A1* | 3/2006 | Walker | F01D 25/162 60/39.08 |
| 2010/0054856 A1* | 3/2010 | Schalla | F16C 7/02 403/408.1 |
| 2017/0328386 A1 | 11/2017 | Athimannil et al. | |
| 2018/0051630 A1 | 2/2018 | Duesler et al. | |
| 2020/0039654 A1* | 2/2020 | Smith | B64D 27/02 |

* cited by examiner

TURBOFAN ENGINE AND CORE LINK THEREFORE

TECHNICAL FIELD

The application related generally to gas turbine engines and, more particularly, to a heat exchange structure therefore.

BACKGROUND OF THE ART

In gas turbine engines, various functionalities can require cooling of a fluid. Cooling of a fluid is typically performed by a dedicated heat exchanger which has a given weight. It is always desired to reduce weight, when possible, in an aircraft. Some heat exchangers extracted air from a bypass flow path for use as the cooling media and directed the extracted air overboard, which affected the efficiency of the engine. There remained room for improvement.

SUMMARY

In one aspect, there is provided a turbofan engine comprising a core engine, a bypass duct surrounding the core engine, an annular bypass flow path between the bypass duct and the core engine, and a plurality of core links extending across the bypass path and supporting the core engine relative to the bypass duct, and a fluid passage having a heat exchange portion in a given one of the core links, the heat exchange portion being configured for heat exchange with the bypass flow path, an inlet leading into the given core link and to the heat exchange portion, and an outlet extending from the heat exchange portion and out of the given core link.

In another aspect, there is provided a core link comprising a structural body, a fluid passage having a heat exchange portion being configured for heat exchange with the bypass flow path, an inlet leading into the structural body and to the heat exchange portion, and an outlet extending from the heat exchange portion and out of the structural body.

In a further aspect, there is provided a method of operating a gas turbine engine comprising circulating compressed gas in an annular flow path radially intersected by a plurality of circumferentially interspaced structural members, circulating a fluid in a fluid passage extending in a given one of the structural members, the circulating fluid being cooled by the compressed gas.

DESCRIPTION OF THE DRAWINGS

Reference is now made to the accompanying figures in which.

DETAILED DESCRIPTION

Figure 1:
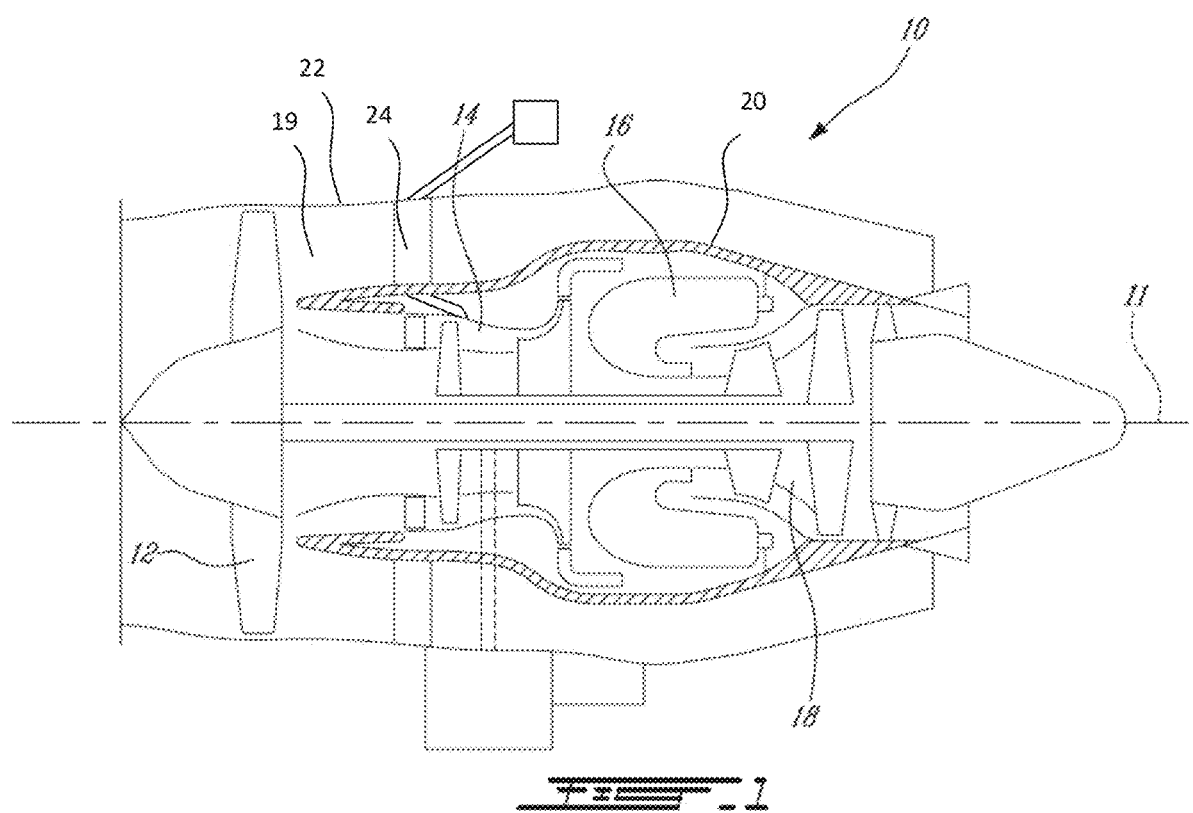
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan, compressor, and turbine sections have rotary components which rotate around an engine axis 11.

Figure 5:
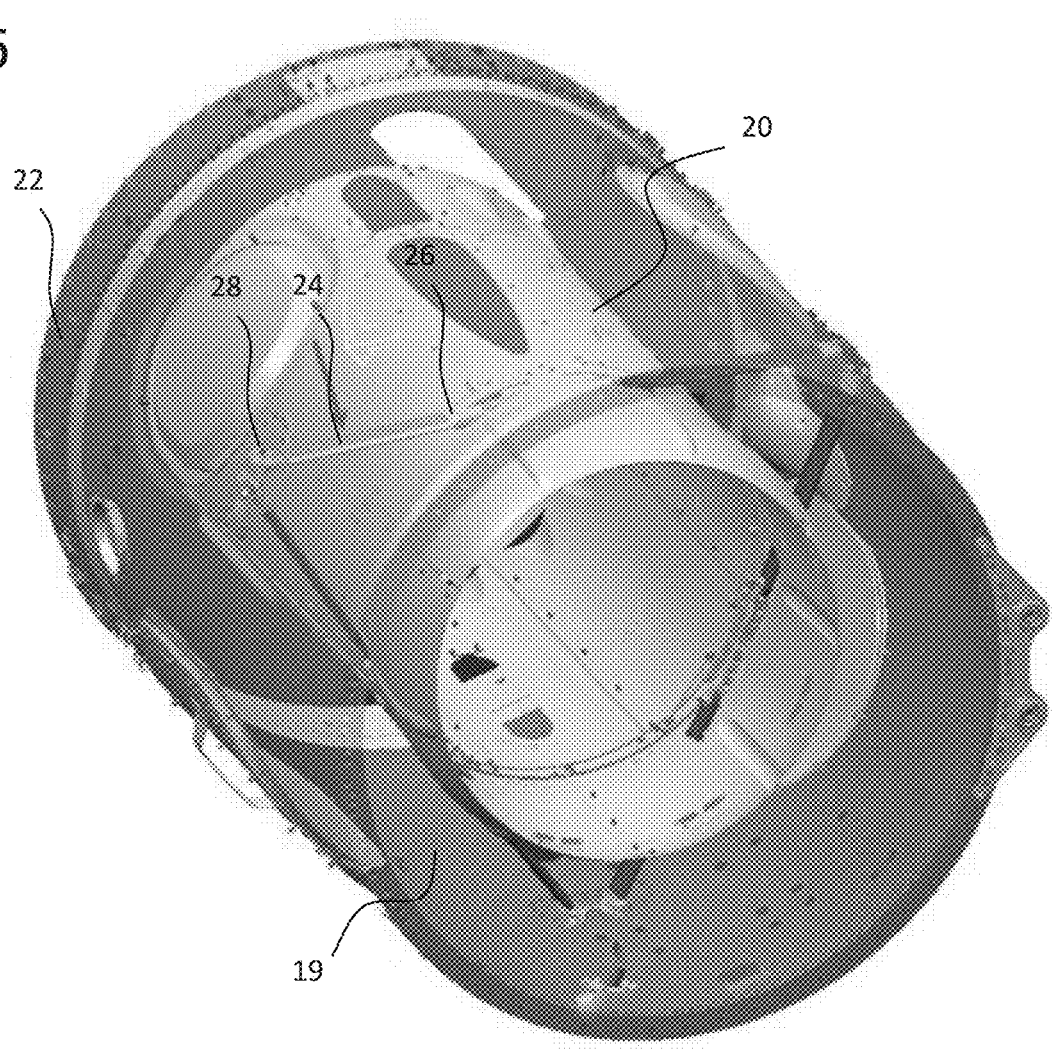
FIG. 5 is an oblique view showing a plurality of core links structurally holding a core engine relative to a bypass duct, in accordance with an embodiment.

The gas turbine engine 10 has an annular bypass flow path 19 extending between a bypass duct 20, which can also be referred to as an outer bypass duct, and an outer surface of the core engine 20, which can be referred to as an inner bypass duct. The core engine 20 is supported relative to the bypass duct 22 by a plurality of core links 24, and each of the core sinks 24 has a length which extends radially, across the bypass flow path. More specifically, and as shown in FIG. 5, the core links 24 also typically extend partially circumferentially, and are configured here in a somewhat triangular pattern, to offer a satisfactory support for the core engine 20. The core links 24 have two opposite ends 26, 28, better seen on FIG. 2 The radially inner end 26 penetrates into the core engine 20 and is secured to a structure thereof, and the radially outer end 28 penetrates across the bypass duct 22 and is secured to a structure which is radially external to the outer bypass duct, in the cowl/bypass duct cavity. A main structural body 30 of the core link 24 extends between the two ends 26, 28. Each end 26, 28 can have a corresponding attachment feature associated with the design of the corresponding structure in the specific embodiment.

Figure 2:
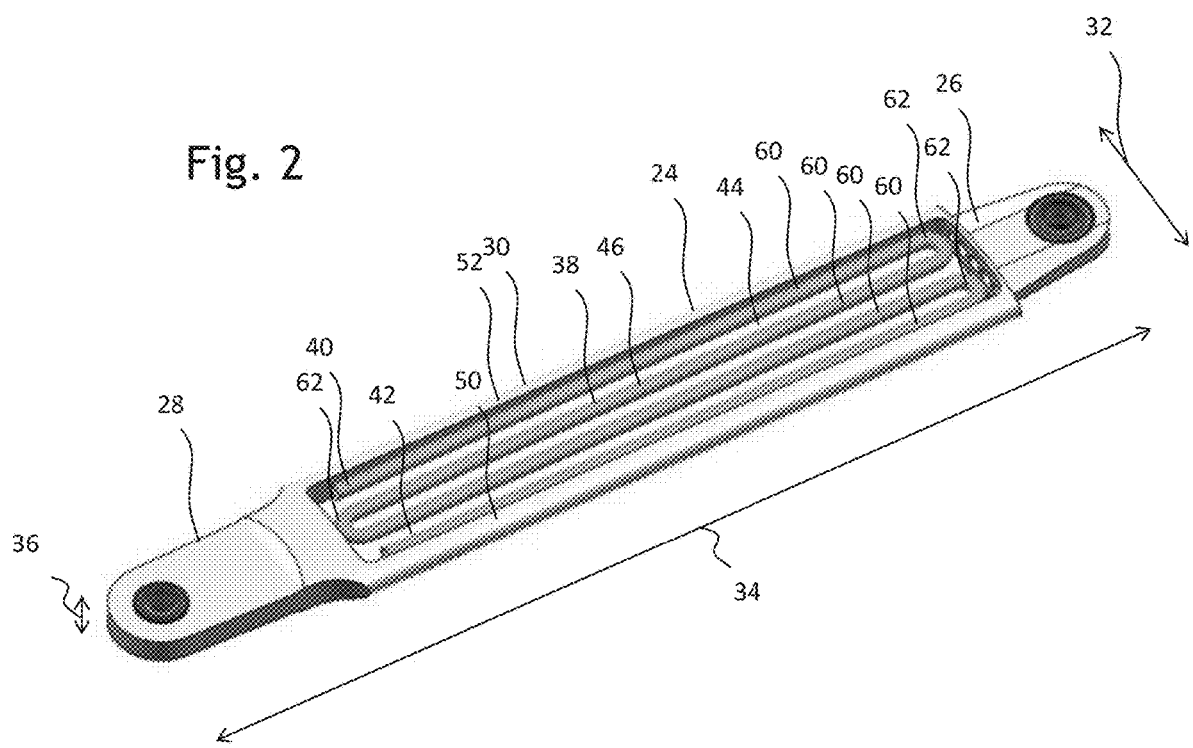
FIG. 2 is an oblique view of a core link, in accordance with an embodiment.

Referring to FIG. 2, an example of a core link 24 is shown. The core link 24 has a depth 32 which is normal to its length 34, and is oriented axially in the gas turbine engine 10. The core link 24 has a thickness 36 which is normal to both its depth 32 and its length 34. A fluid passage 38 is provided inside the core link 34. The fluid passage 38 has a heat exchange portion 46 which is configured to favour heat exchange between the fluid conveyed in the fluid passage, and the compressed air which circulates in the annular flow path 19 during operation of the gas turbine engine 10. The fluid passage 38 has an inlet 40 leading into the core link 24, and an outlet 42 leading out of the core link 24. In one embodiment, the inlet can be positioned radially inwardly, and the outlet can be positioned radially outwardly, to circulate the fluid from the core engine to the cowl, but other configurations are possible depending on the exact application, such as circulating fluid from the cowl and back to the cowl, or from the core and back to the core.

In this example, the structural body 30 of the core link 24 is provided with a heat exchange aperture 44 or window defined across its thickness 36, and the heat exchange portion 46 of the fluid passage 38 extends in the heat exchange aperture 44, exposed to the bypass flow on both sides. The heat exchange aperture 44 is defined longitudinally between the two ends 28, 26, and axially between a front structural member 50, which forms a leading edge of the core link 24, and a rear structural member 52, which forms a trailing edge of the core link 24. The two structural members 50, 52 are designed to collectively satisfy the load requirements of the core link, and the front structural member 50 can be further designed in a manner to shield the fluid passage 38, or more specifically the heat exchange portion 46 thereof, from foreign object damage in accordance with design specifications.

In this embodiment, it was found convenient to design the heat exchange portion of the fluid passage 38 in a manner that it zig-zagged back and forth, filling the surface area of the heat exchange aperture 44 to the extent found practical, in a manner to increase the length of exposure of the fluid to the heat exchange conditions.

In this specific embodiment, it was found practical to achieve this using a metal tube which is folded in a manner to be configured with a plurality of parallel and adjacent straight sections 60, interconnected to one another by corresponding return bends 62.

The choice of the diameter of the tube can be made taking into consideration two main factors. First, the flow rate of the fluid, as reducing or increasing the diameter of the tube can decrease or increase, respectively, the available flow rate. Second, the tube diameter affects the surface to volume ratio, and therefore smaller tubes can be preferred over larger tubes to favour heat exchange rate, which is affected by the surface to volume ratio. In this embodiment, it was preferred to use a tube having between ⅛" and ¼" in diameter, but this choice was made in view of the specific application, which will be presented below.

Figure 3:
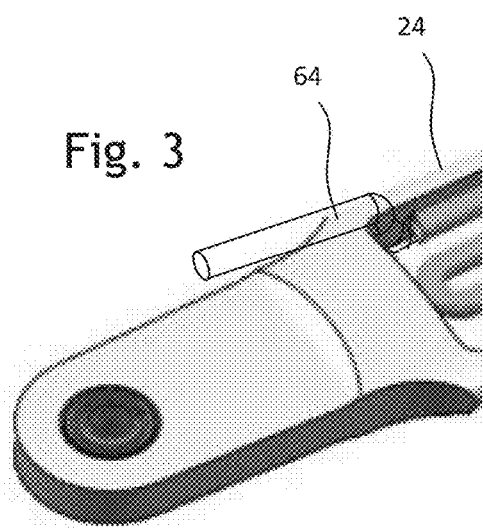
FIG. 3 is a partial oblique view of a core link, showing an example of an inlet or outlet.
Figure 4:
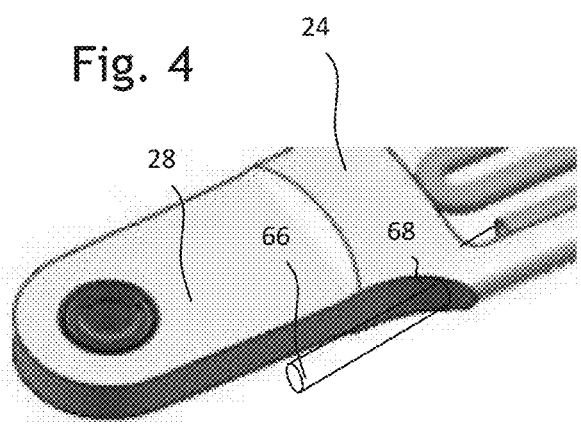
FIG. 4 is a partial oblique view of a core link, showing another example of an inlet or outlet.

Turning to FIGS. 3 and 4, one can see how, in an application using a tube to form the heat exchange portion 46 of the fluid passage 38, the tube can extend to an inlet or an outlet section or segment which can extend into or out from the main body, respectively, to a corresponding conduit. In FIG. 3, the inlet or outlet 64 turns in a manner to become offset from the plane of the core link 24. In FIG. 3, the inlet or outlet 66 extends across a shoulder portion 68 of the structural body 30, which protrudes axially from the corresponding end portion 28.

It can be preferred to secure the tube inside the heat exchange aperture 52 of the core link 24, although it will be understood that this should take into account phenomena such as thermal expansion. Accordingly, it may be found satisfactory to secure the tube using tack welds at neutral points, and/or by using spring clips, for instance.

The structural body 30 of the core link 24 has a structural function, and as well known in the field of aeronautics, structural functions are designed to achieve their design specifications with as little weight and other inconveniences as possible. In this specific embodiment, the structural body 30 of the core link 24 was made of carbon fiber epoxy. Carbon fiber epoxy can resist to temperatures above 250° C., for example, which is typically amply sufficient for the bypass flow path, where temperatures are typically below 220° C. Alternate embodiments may use metal, or another material, instead of carbon fiber epoxy.

In the illustrated embodiment, the fluid passage 38 is used to cool pressurized air, such as P3 air for instance, from the core engine 20, in a manner to reduce its temperature to make it suitable to operate a cowl anti ice actuation system. P3 air can be in the order of 1200° C., for instance, whereas it can be preferred to use pressurized air below 350° C. to cool this system. It was found suitable to achieve this using a heat exchanger, or more specifically a radiator, formed as presented above, i.e. with a heat exchange portion of a fluid passage 38 extending in a core link 24. If more volume of air is required, it can be preferred to provide two, or more, of the core links, with fluid passages and heat exchange portions such as presented above, for example.

The aerodynamic design of the core link can vary from one application to another. On one hand, a designer may wish to limit the amount of drag or turbulence caused by the presence of the core link in the bypass flow path, to increase the engine's efficiency. However, on the other hand, turbulence can be beneficial to heat exchange rate. A suitable trade-off can be selected by persons having ordinary skill in the art, in view of a specific application.

The above description is meant to be exemplary only, and one skilled in the art will recognize that changes may be made to the embodiments described without departing from the scope of the invention disclosed. For example, heat exchanger concepts presented herein can be used to cool fluids for various alternate uses, other than a cowl anti-ice actuation system. Bleed valve actuation is one example, but there are numerous possibilities. The fluid is not necessarily pressurized gas, and in some embodiments, it can be desired to circulate liquid, such as fuel or oil for instance, instead of pressurized gas, in the fluid passage. The fluid passage can be incorporated in other structures than core links, which extend across pressurized gas path in the gas turbine engines, and can be used either for cooling or for heating the fluid, depending of the application. In particular, it may be convenient to incorporate such a fluid passage with a heat exchange portion into a compressor stator vane of a gas turbine engine, instead of a core link, in some applications. Still other modifications which fall within the scope of the present invention will be apparent to those skilled in the art, in light of a review of this disclosure, and such modifications are intended to fall within the appended claims.

The invention claimed is:

1. A turbofan engine comprising
a core engine,
a bypass duct surrounding the core engine,
an annular bypass flow path between the bypass duct and the core engine, and
a plurality of core links extending across the bypass path and structurally supporting at least a. portion of the core engine relative to the bypass duct,
at least one of the core links having
at least one structural member connecting two opposite ends of the at least one of the core links having a front structural member,
a conduit located adjacent the at least one structural member,
the conduit defining a fluid passage in the conduit for heat exchange with air passing through the bypass flow path, the fluid passage communicating with a source of fluid to be cooled, and
a portion of the conduit exposed to the bypass path, an elongated body with
a length extending between the bypass duct and the core engine,
a depth extending axially relative to an axis of the bypass flow path, and a thickness normal to the depth and normal to the length, and
a heat-exchange aperture defined across the thickness and located rearward of the front structural member, wherein the portion of the conduit extends inside the heat exchange aperture.

2. The turbofan engine of claim 1 wherein the at least one structural member further comprises a rear structural member, each of the front and rear structural members are located on a respective one of axial sides of the heat-exchange aperture, the front structural member forming a leading edge and being configured to shield the conduit from foreign object damage, the conduit located between the front and rear structural members.

3. The turbofan engine of claim 1 wherein the two opposite ends include a radially-inner end and a radially-outer end, the radially-inner end penetrating into the core engine and secured to a first structure of the core engine, and the radially-outer end penetrating into the bypass duct and secured to a second structure of the bypass duct.

4. The turbofan engine of claim 1 wherein an inlet connects a core engine conduit to the fluid passage.

5. The turbofan engine of claim 1 wherein an outlet connects the fluid passage to a conduit leading to an actuator.

6. The turbofan engine of claim 1 wherein an outlet connects the fluid passage to a cowl anti ice valve actuation system located externally to the bypass path and core engine.

7. The turbofan engine of claim 1 wherein the conduit is a tube having between ⅛" and ¼" in diameter, the tube defining the fluid passage.

8. The turbofan engine of claim I wherein the at least one of the core links has a body made of carbon fiber epoxy.

9. The turbofan engine of claim 1 wherein the portion of the conduit is a tube folded back and forth to cover an axially and longitudinally extending area.

10. A core link providing structural support structure within a bypass flow path of a gas turbine, comprising
    a structural body with
        a front structural member,
        a rear structural member
        a length extending between a bypass duct and a core engine of the gas turbine,
        a depth extending axially relative to an axis of the bypass flow path,
        a thickness normal to the depth and normal to the length, and
        a heat-exchange aperture defined across the thickness and located between the front and rear structural members,
    a conduit within the structural body,
    a fluid passage defined by the conduit and having
        a heat exchange portion being configured for heat exchange with the bypass flow path,
        a portion of the conduit exposed to the bypass flow path,
        an inlet leading into the structural body and to the heat exchange portion, and
        an outlet extending from the heat exchange portion and out of the structural body, wherein
            the portion of the conduit extends inside the heat exchange aperture.

11. The core link of claim 10 wherein the front structural member forms a leading edge, the portion of the conduit located between the front structural member and the rear structural member.

12. The core link of claim 10 wherein the heat exchange portion of the fluid passage is formed of a tube having between ⅛" and ¼" in diameter.

13. The core link of claim 10 wherein the structural body is made of carbon fiber epoxy.

14. The core link engine of claim 10 wherein the heat exchange portion of the fluid passage has a tube folded back and forth to cover an axially and longitudinally extending area.

* * * * *